UNITED STATES PATENT OFFICE.

FRANK LANGFORD, OF EUREKA, CALIFORNIA.

PROCESS FOR PURIFYING CLAY AND OTHER SILICIOUS AND ALUMINOUS EARTHS AND ORES.

1,251,057.      Specification of Letters Patent.      Patented Dec. 25, 1917.

No Drawing.      Application filed October 12, 1916. Serial No. 125,277.

*To all whom it may concern:*

Be it known that I, FRANK LANGFORD, a citizen of the United States, and a resident of Eureka, in the county of Humboldt and State of California, have invented a certain new and useful Improvement in Processes for Purifying Clay and other Silicious and Aluminous Earths and Ores; and it consists in the steps, combinations, and manipulations hereinafter described and the arrangements as set forth.

An object of my invention is to provide a process by means of which ores not commonly used for the production of aluminum may be prepared for use in producing pure aluminum economically.

A further object of my invention is to provide a process whereby an improved clay may be economically produced for commercial purposes.

A further object of my invention is to provide a process whereby a relatively pure and fine grained silica or sand may be produced economically for use in silica cement and for other commercial purposes.

A further object of my invention is to provide a process whereby clays, sand, laterite and other silicious and aluminous ores and earths may be prepared for use in the production of relatively pure alum, aluminum sulfate, alumina, and aluminum compounds and aluminum sulfate and alumina and aluminum compounds may be economically produced.

A further object of my invention is to provide a process whereby pure sulfur oxids may be economically produced as one step in a cyclic or continuous process.

A further object of my invention is to extract the impurities of clays, aluminous ores, silicious ores and sand, in the form of useful compounds of such metal, mineral or earth impurities of said materials.

A further object of my invention, discovery and process is to render aluminum silicates easily soluble in sulfurous gases or sulfuric acid solutions by first treating them with tannin.

These and other objects and advantages will appear in the following specifications and the novel features of the invention will be pointed out in the appended claims.

In carrying out the process I first treat the crushed clay, earth or ore with a solution of tannin or tannic acid in water, by agitation and leaching in any suitable apparatus, to remove the common impurities, such as iron and other metals and alkalis, compounds of calcium, magnesium and other substances present in the form of oxids and hydroxids, and which are soluble or floatable in tannin or tannic acid solutions. I next separate the solutions from the residue, by any suitable method, such as settling, decanting and the like. Part of the iron or other impurities is removed in this step in combination with the tannic acid wash solution. The remaining residue may be treated as often as desired with fresh lots of tannic acid solution until sufficiently freed of impurities. The final residue is then suitable for use as clay, sand or ore, and the aluminum compounds are more readily soluble in subsequent treatment.

I then treat this purified residue of clay, sand or ore containing silicates, aluminum compounds and substances insoluble in tannin or tannic acid solutions with sulfurous gases or sulfuric acid by agitation or leaching in any suitable apparatus, and separate the resulting sulfate solutions from the silicious and insoluble residue, by any known or suitable apparatus. I then evaporate, crystallize or calcine said solutions, by well known and suitable apparatus and methods, for the production of pure aluminum sulfate and pure alumina, and pure sulfur oxids, which may be used for the production of comparatively pure sulfuric acid to be used in the production of successive batches of sulfate solutions from similar ores or materials similarly purified by this continuous or cyclic process.

The silicious residue or remainder from this last described step in the process will be comparatively fine grained and pure and suitable for use in silica cement, a well known commercial product requiring in its production the finest or impalpable silica, and for other useful purposes.

The impurities extracted by the tannin or tannic acid treatment containing metals, minerals or compounds of iron, titanium, silver, gold, lime, magnesia, alkalis, and like substances, will in certain cases be recoverable and useful commercially.

I claim:

1. The process of treating clays and earthy materials containing aluminum and different metal compounds present as impurities to remove the impurities, which process consists in washing the material to be treated with a solution containing tannic acid, and separating the tannic acid solution with the content of impurities taken up thereby from the aluminous residues.

2. The process of treating clays and earthy materials containing aluminium and iron to remove the iron which process consists in washing the material to be treated with a solution containing tannic acid, and separating the tannic acid solution with the iron content taken up thereby from the aluminous residues.

3. The process of treating aluminous earths and like materials to remove undesirable impurities which process consists in washing the material to be treated with a solution containing tannic acid, removing the solution of tannic acid from the insoluble residue, treating the insoluble residue with sulfuric acid to form a solution of sulfates and an insoluble residue, and separating said solution of sulfates from said insoluble residue.

4. The process of treating clays and like materials containing aluminum silicates and different metal compounds present as impurities to remove the impurities and render the aluminum silicates readily soluble in mineral acid solutions, which process consists in washing the material to be treated with a solution containing tannic acid to take up the impurities, and separating the tannic acid and impurities from the residue not taken up by the tannic acid.

5. The process of treating aluminous earths and like materials containing aluminum silicates to obtain relatively pure silica, which process consists in washing the material to be treated with a solution containing tannic acid, removing the solution of tannic acid with all material dissolved therein or held in suspension thereby from the insoluble residue, treating the insoluble residue with a mineral acid to form a solution and a second insoluble residue containing a high percentage of silica, and separating the solution from the second insoluble residue.

6. The process of treating clays and earthy materials containing aluminum and with iron and alkalis present as impurities to remove the impurities, which process consists in washing the material to be treated with a solution containing tannic acid, and separating the tannic acid solution with the content of impurities taken up thereby from the aluminous residues.

7. The process of treating clays and like materials containing aluminum silicates and with iron and alkalis present as impurities to remove the impurities and render the aluminum silicate readily soluble in mineral acid solutions, which process consists in washing the material to be treated with a solution containing tannic acid to take up the impurities, and separating the tannic acid and impurities from the residue not taken up by the tannic acid.

8. The process of treating clays and earthy materials containing aluminum and with different metal compounds and alkalis present as impurities to remove the impurities, which process consists in washing the material to be treated with a solution containing tannic acid, and separating the tannic acid solution with the content of impurities taken up thereby from the aluminous residue.

9. The process of treating clays and like materials containing aluminum silicates and with different metal compounds and alkalis present as impurities to remove the impurities and render the aluminum silicates readily soluble in mineral acid solutions, which process consists in washing the material to be treated with a solution containing tannic acid to take up the impurities, and separating the tannic acid and impurities from the residue not taken up by the tannic acid.

In testimony whereof I have hereunto set my hand this sixth day of October, A. D. 1916, in the presence of the two subscribed witnesses.

FRANK LANGFORD.

Witnesses:
D. B. RICHARDS,
J. V. SCHROIFF.

Copies of this patent may be obtained for five cents each, by addressing the "Commissioner of Patents, Washington, D. C."